Aug. 26, 1958     R. B. STIENS     2,848,973
MAXIMUM-MINIMUM POINTER ASSEMBLY

Filed Feb. 28, 1956     2 Sheets-Sheet 1

INVENTOR.
ROBERT B. STIENS
BY
J. Warren Kinney, Jr.
ATTORNEY

Aug. 26, 1958  R. B. STIENS  2,848,973
MAXIMUM-MINIMUM POINTER ASSEMBLY
Filed Feb. 28, 1956  2 Sheets-Sheet 2
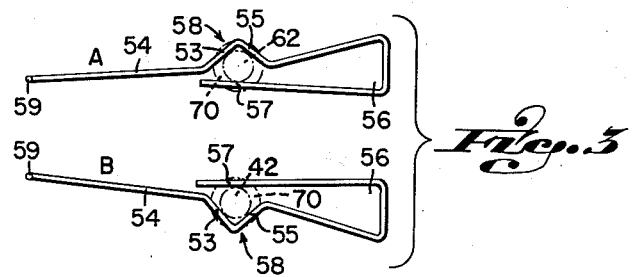
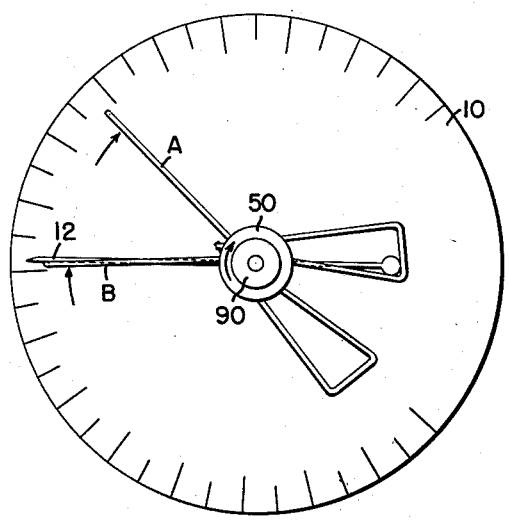
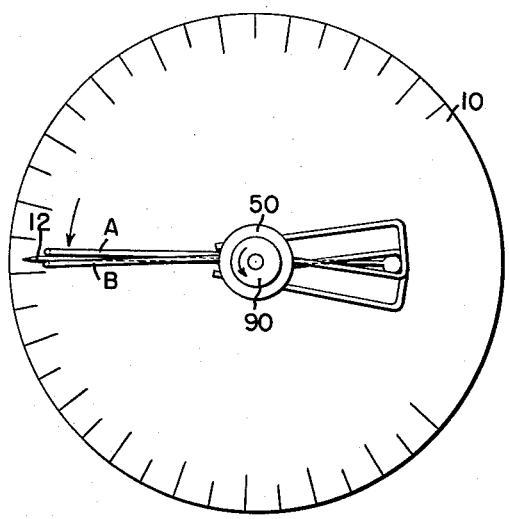
INVENTOR.
ROBERT B. STIENS
BY United States Patent Office 2,848,973
Patented Aug. 26, 1958

2,848,973

MAXIMUM-MINIMUM POINTER ASSEMBLY

Robert B. Stiens, Cincinnati, Ohio, assignor to Palmer Thermometers, Inc., Norwood, Ohio, a corporation of Ohio Application February 28, 1956, Serial No. 568,330

7 Claims. (Cl. 116—129)

This invention relates to a maximum-minimum pointer assembly.

An object of the invention is to provide simple yet effective means for mounting a maximum-minimum pointer assembly in conjunction with, but independently of, an indicating pointer of a recording or indicating instrument.

Another object of the invention is to provide a maximum-minimum pointer assembly which is adapted to be mounted to the transparent cover plate of an instrument of the type which includes a pivotally mounted indicating pointer.

A further object of the invention is to provide a maximum-minimum pointer assembly which includes a pair of setting knobs, one of which, when rotated, will impart a turning force to both of the pointers, whereas a turning force applied to the other knob will impart a turning force to but one of the pointers, thereby enabling the two pointers to be quickly and accurately returned to an initial or zero setting in contacting relationship with the indicator pointer of the instrument.

Still a further object of the invention is to provide a maximum-minimum pointer assembly having the hereinabove described characteristics, and which includes a pair of pointers, per se, each of which is adapted for independent rotational movement relative to the rotatable shafts upon which they are mounted, said pointers being likewise mounted for rotation by the rotatable shafts upon which they are mounted.

These and other objects are attained by the means described herein and as disclosed in the accompanying drawings, in which:

Fig. 3 is a top view of the maximum-minimum pointer elements, per se, comprising a detail of the present invention.

Figs. 4 and 5 are schematic views indicating the manner in which the maximum and minimum pointers of Fig. 1 are returned to an initial or zero setting in contacting relationship with opposite sides of the indicator pointer.

Figure 1:
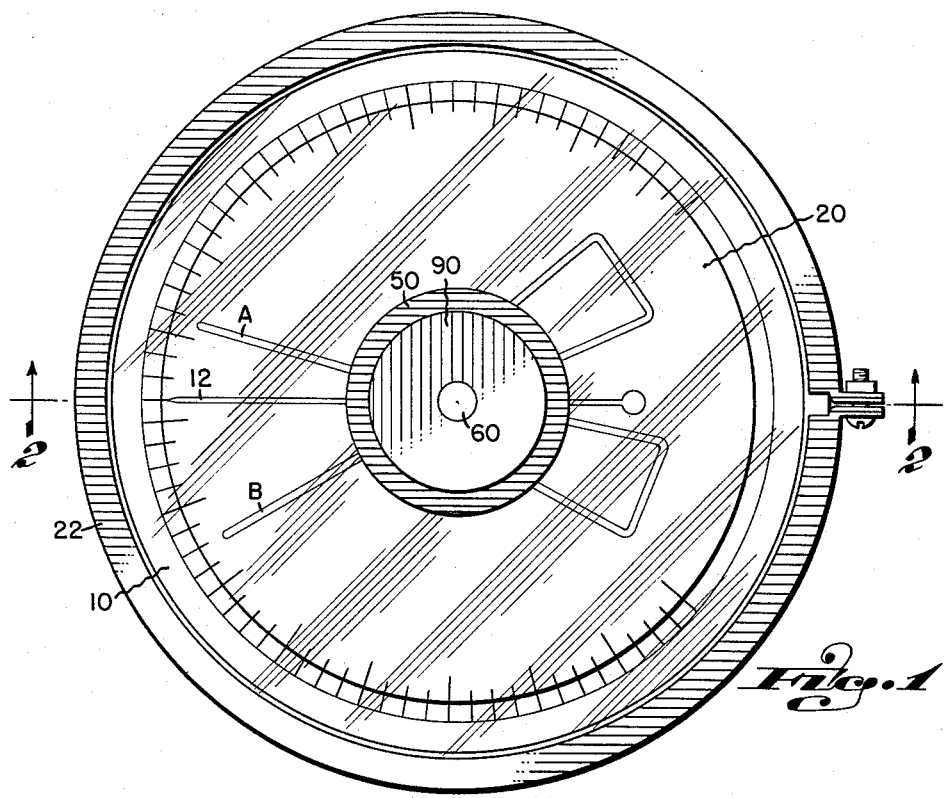
Fig. 1 is a top plan view of an indicator dial provided with a maximum-minimum pointer assembly embodying the teachings of the present invention.
Figure 2:
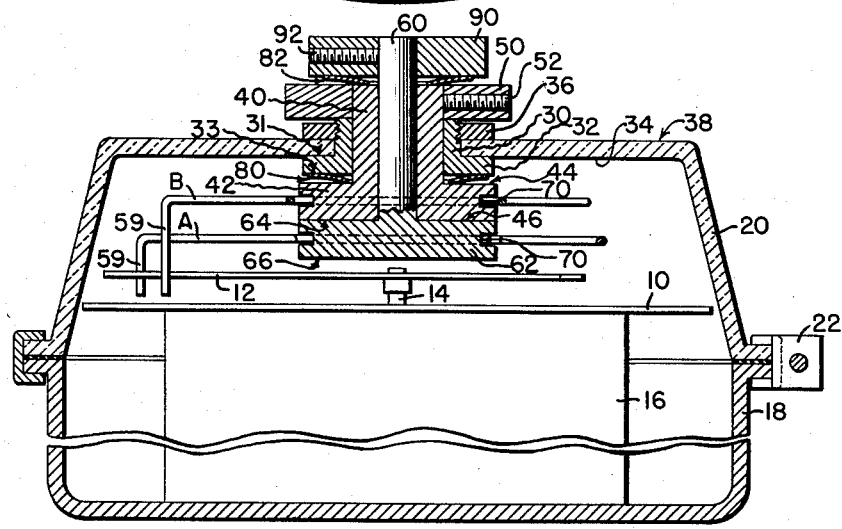
Fig. 2 is a sectional view taken on line 2—2 of Fig. 1.

With reference to Figs. 1 and 2, the numeral 10 denotes generally a dial face and the numeral 12 an indicating pointer secured to and carried by rotatable shaft 14 which is secured in driving relationship with suitable actuating mechanism denoted by or contained within chamber 16 of a typical indicating instrument.

It should be understood that the present invention is neither directed to nor concerned with any particular type of indicating instrument nor with the type of actuating mechanism within chamber 16, such mechanism comprising, by way of example, means responsive to changes in pressure, temperature, humidity, electrical potentials, and the like.

The numeral 18 denotes a housing for the actuating mechanism of the instrument and the numeral 20 denotes, generally, a transparent cover member which, if desired, may be suitably secured to housing 18, such as, by way of example, by means of an annular band 22.

With particular reference now to Fig. 2, the numeral 30 denotes an axially bored mounting bushing having a lower flange 32 provided with opposed, parallel upper and lower axial faces 31 and 33 wherein the upper face is adapted to abut inner face 34 of the transparent cover plate. The other end of the bushing may be provided with a nut 36 having a lower axial face adapted to snugly engage upper face 38 of the plate for thereby securely mounting the bushing relative to casing 20 and in axial alignment with indicator shaft 14.

A hollow, axially bored, first shaft 40 is rotatably journaled in and extends through the axial bore of bushing 30, it being noted that the lower end of shaft 40 terminates in an outturned flange 42 having upper and lower axial faces 44 and 46, respectively. The length of the shaft 40 is such that its upper end will project through and beyond the upper end of the bushing by an amount sufficient to accommodate a first control knob 50 which is fixedly secured thereto such as, by way of example, by means of a set screw 52, or the like.

The numeral 60 denotes a second shaft which is rotatably journaled in and extends axially through the axial bore of the first shaft, having a lower end which terminates in flange 62 provided with opposed parallel axial upper and lower faces 64 and 66.

Each of the flanges 42 and 62 is provided with a continuous peripheral groove 70.

The numeral 80 denotes generally a friction clutch member which, if desired, may be fabricated from resilient washer material, that is, it may comprise an annular spring-type friction washer, or the like. The numeral 82 denotes a second, similar friction clutch element.

Friction clutch element 80 is disposed between the adjacent axial faces 33 and 44 of bushing flange 32 and flange 42 of the first shaft, it being noted that control knob 50 exerts an upward, endwise, axial force to shaft 40 for exerting a compressive force on the friction clutch member whereby rotation of the first shaft relative to the bushing is normally though yieldably retarded.

The second frictional clutch element 82 is located between the upper end of the first shaft 40 and the lower face of a second control knob 90 which is secured to and carried by the free outer end of second shaft 60 such as by means of a set screw 92. Control knob 90 exerts an upward, endwise, axial force to shaft 60 for subjecting the second frictional clutch element to a compressive force whereby rotation of the second shaft relative to the first shaft is normally though yieldably retarded. Knob 90 likewise disposes adjacent faces 46 and 64 of flanges 42 and 62 in sliding contact.

The letters A and B denote generally the maximum and minimum pointers of the assembly, pointer B being rotatably mounted on flange 42 of the first shaft 40, pointer A being similarly mounted on flange 62 of the second shaft 60.

With particular reference now to Fig. 3, it will be noted that each pointer is fabricated from a single length of wire formed to provide a forward indicating portion 54, a rear portion 56 and an intermediate portion 58 defined, by way of example, by connected, angularly disposed legs 53 and 55 and free end 57 which collectively define a discontinuous flange-engaging portion receivable in the peripheral grooves 70 of flanges 42 and 62.

It is of prime importance that each of pointers A and B are secured to their respective flanges 62 and 42 in such a manner that they may be easily rotated relative to their flanges by the low-torque turning force imparted by the instrument pointer 12 to the downturned ends 59 of the maximum-minimum pointers, see Fig. 2. However, pointers A and B should be secured to their respective flanges with sufficient friction whereby to prevent accidental or unintentional relative movement as might be induced by external forces other than by instrument pointer 12.

Another requirement of the mounting between the pointers A and B and their respective flanges is that the pointers be movable with their flanges incident to rotation of their respective shafts.

With reference now to Figs. 1, 4 and 5, it will be noted that when it is desired to reset the pointers A and B to an initial or zero setting in contacting relationship with the instrument pointer 12, as in Fig. 5, both pointers may be simultaneously advanced by turning knob 50, which will turn not only shaft 40, but also shaft 60, by reason of the friction clutch means 82, whereby pointer B will be advanced clockwise to engage one side of pointer 12 while pointer A will be swung farther away from pointer 12 by the same arc, to the relative position illustrated in Fig. 4. Knob 90 may then be rotated for returning pointer A in a counter-clockwise direction to the position of Fig. 5 without disturbing the setting of pointer B by reason of the resistance of friction clutch 80 which yieldably precludes relative rotation between shaft 40 and fixed bushing 30.

Turning of knobs 90 and/or 50 beyond those positions where pointers A and B contact the instrument pointer will not damage either pointers A and B nor 12, since the earlier described relationship between pointers A and B and their respective flanges 62 and 42 will result in relative motion between said pointers and their flanges when said pointers encounter a resistance of such small magnitude as would be offered by the instrument pointer 12.

From the foregoing it will be noted that I have thus provided simple yet highly effective means for accomplishing the stated objects of the invention.

It should be understood that various changes in the structural details of the device may be made, within the scope of the appended claims, without departing from the spirit of the invention.

What is claimed is:

1. A maximum-minimum pointer assembly comprising an axially bored bushing having a lower end which terminates in an outturned flange having a lower axial face, a hollow first shaft rotatably journaled in and extending through the bore of said bushing, the lower end of said shaft circumscribed by a flange having parallel upper and lower axial faces, friction means between the upper face of said shaft flange and the lower axial face of the bushing flange, a first control knob secured to, carried by and projecting outwardly from the upper end of said first shaft above the bushing, said first control knob securing the adjacent faces of the first shaft flange and bushing flange in axial engagement with said friction means, a second shaft extending axially through said hollow first shaft, the lower end of the second shaft terminating in a flange having parallel upper and lower axial faces, a second control knob secured to and carried by the free end of the second shaft beyond the first control knob, friction means disposed between the adjacent faces of said first and second control knobs, said second control knob securing the second shaft relative to the first shaft with the adjacent faces of the flanges of said first and second shafts in contacting relationship, and securing the adjacent faces of the said first and second control knobs in axial engagement with said last mentioned friction means, whereby turning of the first control knob will simultaneously rotate the first and second shafts relative to the bushing, and turning of the second control knob will rotate only the second shaft.

2. A maximum-minimum pointer assembly comprising an axially bored bushing having a lower end which terminates in an outturned flange having a lower axial face, a hollow first shaft rotatably journaled in and extending through the bore of said bushing, the lower end of said shaft circumscribed by a flange having parallel upper and lower axial faces, friction means between the upper face of said shaft flange and the lower axial face of the bushing flange, a first control knob secured to, carried by and projecting outwardly from the upper end of said first shaft above and riding upon the upper end of the bushing, said first control knob imparting an axial force to the said first shaft for compressing the friction means between the adjacent faces of the respective flanges of the first shaft and bushing, a second shaft extending axially through said hollow first shaft, the lower end of the second shaft terminating in a flange having parallel upper and lower axial faces, a second control knob secured to and carried by the free end of the second shaft beyond the first control knob, friction means disposed between the lower face of the second control knob and the free end of the bushing, said second control knob imparting an axial force to the second shaft for compressing the last mentioned friction means between the said second control knob and bushing end, and for disposing the adjacent faces of the flanges of said first and second shafts in contacting relationship, whereby turning of the first control knob will simultaneously rotate the first and second shafts relative to the bushing, and turning of the second control knob will rotate only the second shaft.

3. A maximum-minimum pointer assembly comprising an axially bored bushing having a lower end which terminates in an outturned flange having a lower axial face, a hollow first shaft rotatably journaled in and extending through the bore of said bushing, the lower end of said shaft circumscribed by a flange having parallel upper and lower axial faces, friction means between the upper face of said shaft flange and the lower face of the bushing flange, a first control knob secured to, carried by and projecting outwardly from the upper end of the first shaft above and riding upon the upper end of the bushing, said control knob imparting an axial force to the first shaft for compressing the friction means between the adjacent faces of the respective flanges of the first shaft and bushing, a second shaft extending axially through said first hollow shaft, the lower end of the second shaft terminating in a flange having an upper axial face, a peripheral groove circumscribing the respective flanges of the first and second shafts, a second control knob secured to and carried by the free end of the second shaft beyond the first control knob, friction means disposed between the lower face of the second control knob and the free end of the bushing, said second control knob imparting an axial force to the second shaft for compressing the last mentioned friction means between the said knob and bushing end, and for disposing the adjacent faces of the respective flanges of the first and second shafts in sliding-contact relationship, said first control knob adapted to simultaneously rotate the first and second shafts relative to the bushing, the second control knob adapted to rotate only the second shaft, and a pair of pointers disposed one in the peripheral groove of each of the flanges of the first and second shafts.

4. A maximum-minimum pointer assembly comprising an axially bored bushing having a lower end which terminates in an outturned flange having a lower axial face, a hollow first shaft rotatably journaled in and extending through the bore of said bushing, the lower end of said shaft circumscribed by a flange having parallel upper and lower axial faces, an annular spring-type friction washer located between the adjacent faces of the respective flanges of said first shaft and bushing, a first control knob secured to, carried by and projecting outwardly from the upper end of the first shaft above the bushing, said control knob securing the adjacent faces of the first shaft flange and bushing flange in axial compressive engagement with said washer, a second shaft extending axially through said first hollow shaft, the lower end of the second shaft terminating in a flange having an upper axial face, a second control knob secured to and carried by the free end of the second shaft beyond the first control knob, an annular spring-type friction washer located between the lower face of the second control knob and the free end of the bushing, said second control knob securing the second shaft relative to the first shaft with the adjacent faces of the respective flanges of said first and second shafts in sliding contact, and with the lower face of second control knob and the upper end of the bushing in axial compressive engagement with said last mentioned washer, for connecting the first control knob in driving relationship with the first and second shafts relative to the bushing, and the second control knob in driving relationship with only the second shaft.

5. A maximum-minimum pointer assembly comprising an axially bored mounting bushing, a first shaft rotatably journaled in said bushing, a second shaft extending axially through said first shaft, frictional clutch means interconnecting the bushing and first shaft, other frictional clutch means interconnecting the first and second shafts for disposing the first shaft in driving relationship with the second shaft and the second shaft for rotation independently of the first shaft.

6. A maximum-minimum pointer assembly comprising an axially bored mounting-bushing having a lower end which terminates in an outturned flange having a lower axial face, a hollow, first shaft rotatably journaled in and extending through the bore of said bushing and terminating at its lower end in a flange having parallel upper and lower axial faces, friction clutch means between the adjacent faces of said shaft and bushing flanges, a first control knob secured to, carried by and projecting outwardly from the upper end of the said first shaft above and riding upon the upper end of the bushing, a second shaft extending axially through said first shaft, the lower end of the second shaft terminating in a flange having an upper axial face, a peripheral groove circumscribing each of the shaft flanges, a second control knob secured to and carried by the free end of the second shaft beyond the first control knob, friction clutch means disposed between the second control knob and the free end of the bushing, a pair of pointers, each pointer fabricated from a single length of wire formed to provide a forward indicating portion, an intermediate mounting portion and a rear portion, said intermediate portions including a discontinuous flange-engaging portion receivable in the peripheral groove of a flange for rotatably mounting a pointer on its respective shaft flange, said first control knob adapted to simultaneously rotate both the first and second shafts and their respective pointers relative to the bushing, the second control knob adapted to rotate only the second shaft and its respective pointer.

7. A maximum-minimum pointer assembly comprising an axially bored mounting bushing, a first hollow shaft rotatably journaled in said bushing, a second shaft extending axially through and rotatably journaled in said first shaft, frictional clutch means interconnecting the bushing and first shaft, other frictional clutch means interconnecting the first and second shafts for disposing the first shaft in driving relationship with the second shaft and the second shaft for rotation independently of the first shaft, and a pair of pointers rotatably journaled one relative to each shaft, said pointers rotatable relative to their respective shafts, said pointers likewise rotatable by their said shafts.

References Cited in the file of this patent

UNITED STATES PATENTS

| | | |
|---|---|---|
| 1,397,547 | Reeves | Nov. 22, 1921 |
| 2,706,962 | Kebbon | Apr. 26, 1955 |

FOREIGN PATENTS

| | | |
|---|---|---|
| 193,117 | Switzerland | Dec. 1, 1937 |
| 236,260 | Switzerland | June 1, 1945 |